March 1, 1938.  A. W. LEMMON  2,109,923
SELF ALIGNING BELT IDLER
Filed Dec. 5, 1935
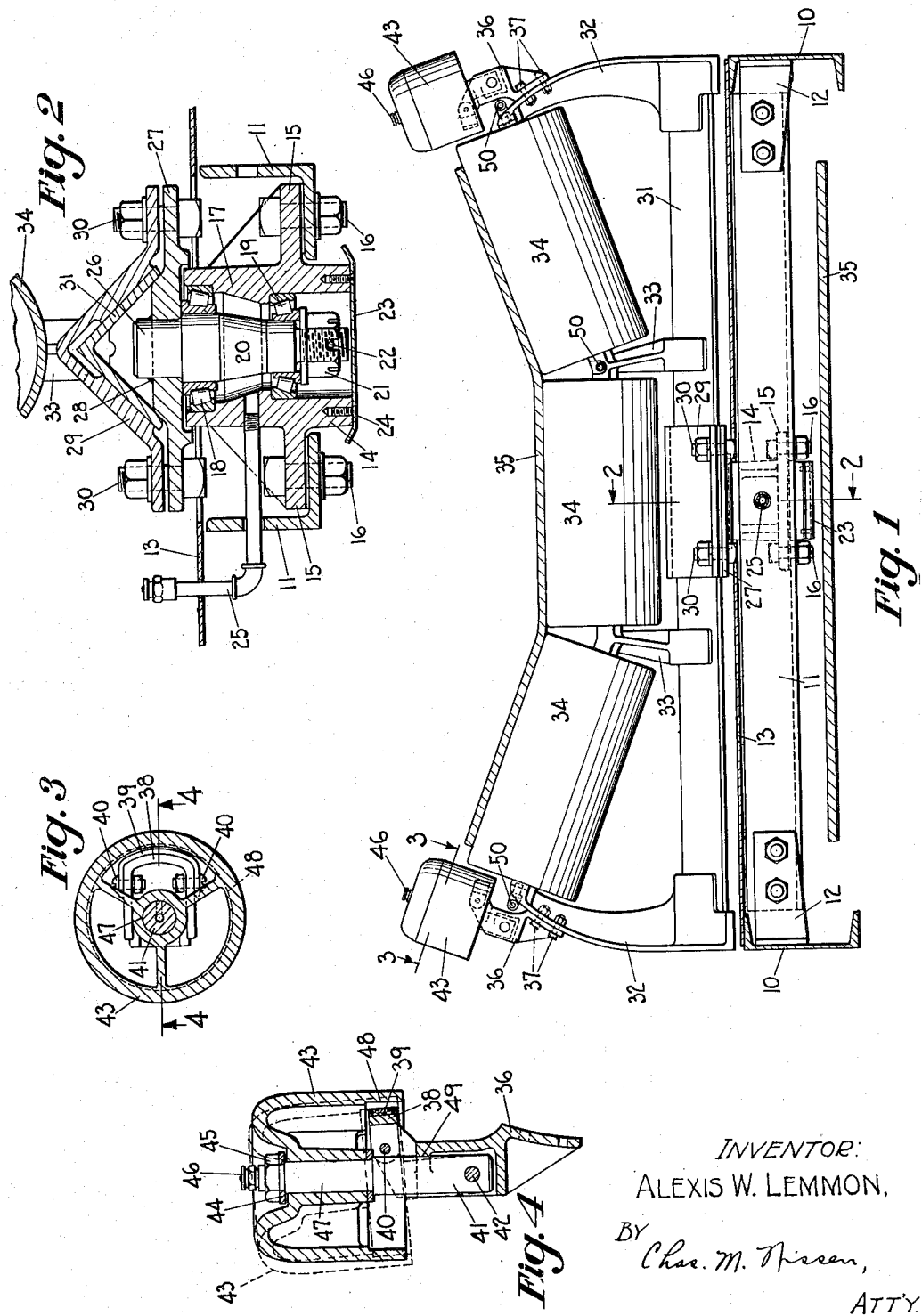
INVENTOR:
ALEXIS W. LEMMON,
BY Chas. M. Nissen,
ATT'Y.

Patented Mar. 1, 1938

2,109,923

UNITED STATES PATENT OFFICE 2,109,923

SELF-ALIGNING BELT IDLER

Alexis W. Lemmon, Columbus, Ohio, assignor to The Jeffrey Manufacturing Company, a corporation of Ohio Application December 5, 1935, Serial No. 53,054

8 Claims. (Cl. 198—202)

This invention relates to a self-aligning belt idler. An object of the invention is to provide a simple but effective self-aligning belt idler which will maintain the belt of a belt conveyor in proper alignment at all times.

A more specific object of the invention is to provide a pivoted supporting frame having belt idlers thereon which is automatically operable to swing about its pivot in response to any appreciable movement of the belt from its normal position and to return said belt to its normal position.

Other objects of the invention will appear hereinafter, the novel features and combinations being set forth in the appended claims.

In the accompanying drawing,

Fig. 1 is an elevational view of a self-aligning idler comprising my invention;

Fig. 2 is a sectional view taken on the line 2—2 of Fig. 1, looking in the direction of the arrows;

Fig. 3 is a sectional view taken on the line 3—3 of Fig. 1 looking in the direction of the arrows; and Fig. 4 is a sectional view taken on the line of 4—4 of Fig. 3 looking in the direction of the arrows.

Referring particularly to the drawing, it is to be seen that a main conveyor frame is provided comprising longitudinally extending channel members 10, 10 between which extend transverse angle members 11, 11 (see Fig. 2), which are rigidly attached to said channel members 10, 10 as by brackets 12, 12. Also extending between the channel members 10, 10 and positioned above the angle members 11, 11 there is a cover plate 13.

As best seen in Fig. 2, the angle members 11, 11 are spaced apart, and carried between them and substantially intermediate the two channel members 10, 10 is a casting 14. Said casting 14 is provided with a pair of side brackets 15, 15 adapted to be supported by the angle members 11, 11 and rigidly attached thereto as by nuts and bolts 16, 16.

The top portion of the casting 14 forms a cup 17 adapted to carry a pair of roller thrust bearings 18 and 19. Supported on said thrust bearings 18 and 19 is a vertically extending shaft 20, the lower end of which is rigidly attached to the inner race of the roller bearing 19 by a nut 21 and cotter pin 22. The bottom opening of the casting 14 is closed by a removable cover plate 23 held in place as by screws 24. This cover plate 23 also serves the purpose of a guide plate for the lower run of the belt, insuring that said lower run does not contact the bolts 16.

The complete interior portion of the casting 14, including the cup 17, may be filled with lubricating material by virtue of a lubrication fitting 25. Adjacent its top the shaft 20 has a reduced neck 26 upon which fits a plate 27 which may be rigidly attached thereto as by welding 28. Cooperating with the plate 27 is a cap 29 which is rigidly, but removably, attached thereto as by nuts and bolts 30, 30. The plate 27 and the cap 29 comprise a clamp for a pivoted frame including a transversely extending angle member 31, whose length is substantially co-extensive with the channel members 10, 10. This removable clamp provides for an adjustable centering of the pivoted frame and angle members 31 with respect to the main conveyor frame.

From the description of the elements above given it will be manifest that the angle member 31 is rigidly bolted or attached to the shaft 20, which shaft is pivotally mounted in the antifriction roller bearings 18 and 19 carried by the casting 14, all of which is supported upon the channel members 10 by the transverse angle members 11. The angle member 31 is therefore free to swing about the vertical axis of the shaft 20. Upon the angle member 31 there is mounted a plurality of belt idler stands of which there are two end stands 32 and two intermediate stands 33. As illustrated in the drawing, the end stands 32 are higher than the intermediate stands 33. Said stands cooperate to support three idler rollers 34 in a trough-like manner. If desired, the intermediate stands 33 might be eliminated and a single idler roller might be supported between the end stands 32, 32. It will, of course, be obvious that the idler rollers 34 are adapted to support the upper run of the belt 35 and form it into a trough shape. Each of the end stands 32 carries an upright end roller which cooperates with the belt 35 to provide the automatic aligning function of my invention. As these two devices are similar only one will be described and it will be understood that the description applies to both.

A bracket 36 is rigidly attached to an end stand 32 as by nuts and bolts 37. Said bracket is provided at its upper end with a U-shaped portion 38 (see Fig. 3). This U-shaped portion 38 carries at its bottom a lining of brake lining material 39 which is removably attached as by nuts and bolts 40 whereby it may be renewed upon being excessively worn. Pivoted to the bracket 36 at its lower end is an upstanding shaft 41 which is pivoted about the pin 42. Adjacent its upper end the shaft 41 is of reduced diameter and forms a journal 47 for a cup-shaped end roller 43. The roller 43 is retained on the shaft 41 by a washer 44 and nut 45. The shaft 41 may also be provided with a lubrication fitting 46 to provide for lubrication of the journal 47 of said roller 43. Adjacent its bottom the roller 43 is provided with a track or brake drum 48 adapted to cooperate with the lining 39, thereby to apply friction to said roller 43 when said roller is moved to the dotted line position illustrated in Fig. 4. Due to the fact that the axis of the shaft 41 is slightly inclined, as illusrated in Fig. 1. the roller 43 will be so biased that in its normal position the brake drum 48 will not contact the lining 39 and thus it will be free to rotate. That is to say, the U-shaped brake band 39 being secured to the U-shaped support 38 and the latter being rigidly secured to the bracket 36 by means of welding or otherwise, the brake device element comprising the brake lining material 39, is always in stationary position relative to the standard 32 and the transverse support 31. The weight of the cup-shaped roller 43 is such that it leans inwardly toward the adjacent roller 34, the lower end of the journal 47 being pivoted at 42 and abutting above the latter at 49 against the bracket 36.

It is also to be noted that the rollers 34 have grease fittings 50 associated with the stationary shafts thereof whereby the bearings thereof may be lubricated.

It is further to be noted in connection with Fig. 2 that the outer race of the roller bearing 18 is carried in a recess in casting 14 which has a lower retaining flange to restrict the downward movement of said bearing 18. The lower roller bearing 19 has its outer race carried in a recess which extends upwardly from the bottom of casting 14 terminating in a flange which restricts upward movement of said bearing 19. The two tapered roller bearings 18 and 19 thus restrict the vertical movement of shaft 20, while supporting it for free rotary movement. By removing screws 24 and plate 23, access is gained to the hollow casting or receptacle 14 to clean it out or inspect it. By further removing cotter pin 22 and nut 20, with the associated washer, shaft 20 and the swinging frame attached thereto may be removed for inspection and repair. The nut 21 also provides for proper adjustment of the bearings 18 and 19.

In the operation of the device the belt 35 will normally be in the position illustrated in Fig. 1. However, if, for any cause, said belt moves from its normal position either to the right or left, the edge thereof will engage one of the rollers 43. When this engagement takes place the roller 43 will be moved outwardly and the shaft 41 will pivot about the pin 42. After a small amount of movement the brake drum 48 of the roller 43 will engage the lining 39, thereby applying friction to the roller 43 and retarding its free rotation. As a consequence, the entire mechanism, which is supported upon the angle member 31, will be pivoted about the axis of the upright shaft 20. This movement will then force the belt 35 back towards its normal position and as the belt moves toward the normal position, the engagement between said belt and the end roller 43 will be discontinued and the belt will be automatically restored to its normal position, whereupon the pivoted frame including the angle member 31, and those elements carried thereby, will return to its normal position. In view of the fact that the end rollers 43 are provided on each end of the self-aligning idler, it will be evident that movement of the belt 35 out of position to either side, will be corrected, and the belt will be returned to its normal position.

It is thus evident that a very simple device has been provided for automatically centering or maintaining a conveyor belt in proper alignment, and this has been done without in any way restricting the free movement of the main belt idlers 34. This is an important feature of my invention, for in normal operation the end rollers 43 do not rotate and thus friction is applied to restrict the rotation of rollers which are normally not in operation when the belt is properly aligned.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. In a self aligning belt idler, the combination with a base frame, of an idler supporting frame pivoted thereon for movement about an upright axis, belt supporting idler means on said supporting frame, end rollers on each end of said supporting frame mounted on individual pivoted upwardly extending shafts, said end rollers being normally out of engagement with the belt when the latter is in proper alignment, and friction means positioned to apply friction to said end rollers to swing said supporting frame on its pivot thereby to align said belt when the belt contacts one of said end rollers due to its improper alignment and swings it on its pivoted shaft.

2. In a self aligning belt idler, the combination with a base frame, of a belt idler supporting frame pivoted thereto for movement about an upright axis, end idler supporting stands on said support frame, normally inoperative end rollers mounted on pivoted shafts on said stands, and friction brake means cooperating with said end rollers to apply a braking action thereto when they are swung on their shafts to a predetermined degree by a belt moving from its normal path, thereby to swing said supporting frame to align the belt.

3. In a self aligning belt idler, the combination with a base frame, of a belt idler supporting frame pivoted thereto for movement about an upright axis, end idler supporting stands on said supporting frame, upwardly extending shafts pivoted to said end stands, normally inoperative end rollers carried on the said shafts, friction brake means carried by said stands and constructed and arranged to apply a braking action to said end rollers when they are moved about the pivot point of said shafts under the influence of an improperly aligned belt, thereby to rotate said supporting frame about its upright axis to align said belt.

4. An end roller assembly for a self aligning belt idler comprising a bracket, an upwardly extending inclined shaft pivoted at its bottom to said bracket, a friction brake means carried by said bracket, and a roller journaled on said shaft, said roller having a brake drum adapted to contact said friction brake means when said shaft is pivoted a predetermined amount.

5. An end roller assembly for a self aligning belt idler comprising a bracket, an upwardly extending shaft pivoted at its bottom to said bracket, a friction brake means carried by said bracket, and a roller journaled on said shaft, said roller having a brake drum adapted to contact said friction brake means when said shaft is pivoted a predetermined amount.

6. An end roller supporting bracket comprising a body, brake means on said body comprising a U-shaped member attached at each end to said body, and brake lining attached to the outer bottom surface of said U-shaped member.

7. An end roller support comprising a bracket, an upstanding shaft pivoted at its bottom to said bracket, a roller carried on said shaft, brake means adapted to cooperate with said roller to effect a braking action thereon, and an abutment on said bracket against which said shaft is adapted to rest while the brake means is inoperative.

8. An end roller support comprising a bracket, an upstanding shaft pivoted at its bottom to said bracket, a roller carried on said shaft, and brake means adapted to apply friction to said roller when said shaft is pivoted to one position of adjustment.

ALEXIS W. LEMMON.